United States Patent
Hatano et al.

(10) Patent No.: US 8,180,472 B2
(45) Date of Patent: May 15, 2012

(54) CONTROL METHOD FOR SEMICONDUCTOR MANUFACTURING APPARATUS, CONTROL SYSTEM FOR SEMICONDUCTOR MANUFACTURING APPARATUS, AND MANUFACTURING METHOD FOR SEMICONDUCTOR DEVICE

(75) Inventors: Masayuki Hatano, Kanagawa (JP); Tetsuro Nakasugi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 413 days.

(21) Appl. No.: 12/497,349

(22) Filed: Jul. 2, 2009

(65) Prior Publication Data
US 2010/0023146 A1 Jan. 28, 2010

(30) Foreign Application Priority Data
Jul. 28, 2008 (JP) ................................ 2008-193132

(51) Int. Cl.
*G06F 19/00* (2011.01)
(52) U.S. Cl. ........................................ 700/110; 700/121
(58) Field of Classification Search .................. 700/110, 700/121
See application file for complete search history.

(56) References Cited

U.S. PATENT DOCUMENTS

| | | | |
|---|---|---|---|
| 6,351,723 | B1 | 2/2002 | Maekawa |
| 6,725,402 | B1 | 4/2004 | Coss, Jr. et al. |
| 7,477,960 | B2 * | 1/2009 | Willis et al. ............... 700/121 |
| 2003/0199108 | A1 * | 10/2003 | Tanaka et al. ............... 438/14 |
| 2004/0049898 | A1 | 3/2004 | Imai et al. |

FOREIGN PATENT DOCUMENTS
JP 2000-133568 5/2000
* cited by examiner

*Primary Examiner* — Ryan Jarrett
(74) *Attorney, Agent, or Firm* — Finnegan, Henderson, Farabow, Garrett & Dunner, L.L.P.

(57) ABSTRACT

A control method for a semiconductor manufacturing apparatus, comprising: generating, as log data, a history of operation states of the semiconductor manufacturing apparatus when a wafer is processed by the semiconductor manufacturing apparatus; specifying, based on the log data, processing results in which operation states of the semiconductor manufacturing apparatus are abnormal states out of processing results after the processing of the wafer processed by the semiconductor manufacturing apparatus as abnormal processing results; creating control data for the semiconductor manufacturing apparatus based on the processing results and the abnormal processing results; and controlling the processing by the semiconductor manufacturing apparatus using the control data.

17 Claims, 6 Drawing Sheets

| DETAILED EXPOSURE DATA RETICLE ORTHOGONALITY [μ rad] | WEIGHTING COEFFICIENT |
|---|---|
| 0.05 OR LARGER | 0 |
| 004 OR LARGER AND SMALLER THAN 0.05 | 0.5 |
| SMALLER THAN 0.04 | 1 |

FIG.7

| DETAILED EXPOSURE DATA RETICLE ORTHOGONALITY [μrad] | WEIGHTING COEFFICIENT |
|---|---|
| 0.05 OR LARGER | 0 |
| 004 OR LARGER AND SMALLER THAN 0.05 | 0.5 |
| SMALLER THAN 0.04 | 1 |

FIG.8

| DETAILED EXPOSURE DATA RETICLE ROTATION AMOUNT [μrad] | WEIGHTING COEFFICIENT |
|---|---|
| 0.05 OR LARGER | 0 |
| 0.04 OR LARGER AND SMALLER THAN 0.05 | 0.5 |
| SMALLER THAN 0.04 | 1 |

CONTROL METHOD FOR SEMICONDUCTOR MANUFACTURING APPARATUS, CONTROL SYSTEM FOR SEMICONDUCTOR MANUFACTURING APPARATUS, AND MANUFACTURING METHOD FOR SEMICONDUCTOR DEVICE

CROSS-REFERENCE TO RELATED APPLICATIONS

This application is based upon and claims the benefit of priority from the prior Japanese Patent Application No. 2008-193132, filed on Jul. 28, 2008; the entire contents of which are incorporated herein by reference.

BACKGROUND OF THE INVENTION

1. Field of the Invention

The present invention relates to a control method for a semiconductor manufacturing apparatus, a control system for the semiconductor manufacturing apparatus, and a manufacturing method for a semiconductor device.

2. Description of the Related Art

When a semiconductor device is manufactured, processing conditions such as an exposure dose are set in advance in a semiconductor manufacturing apparatus such as an exposure apparatus. Exposure processing and the like are performed according to the processing conditions. However, even if the exposure processing is performed under the same processing conditions, pattern dimensions of a pattern formed on a wafer shift because of various factors. Therefore, after the exposure processing or development processing is performed, pattern dimensions of a semiconductor device formed on the wafer are measured and the processing conditions for the exposure apparatus and the like are controlled based on a measurement result. In a feedback method for controlling the exposure apparatus and the like in this way, the exposure processing and the like for a lot to be exposed next are controlled by using, for example, data for latest one lot.

In a measurement value detecting method disclosed in Japanese Patent Application Laid-Open No. 2000-133568, predicted ranges of pattern dimensions and the like are set by measuring a plurality of wafers manufactured under various processing conditions in advance. When pattern dimensions (measurement values) outside the predicted ranges are detected when a semiconductor device is actually manufactured, feedback control is performed by excluding the pattern dimensions outside the predicted ranges from a measurement value group to be fed back.

In the technology in the past explained above, the feedback control is performed based on only measurement values in disregard of a state of the semiconductor manufacturing apparatus. However, in semiconductor manufacturing apparatuses such as an exposure apparatus and a resist applying and developing apparatus, manufacturing characteristics may fluctuate because of external factors and internal factors. In such a case, if control data for the semiconductor manufacturing apparatuses is predicted in disregard of a state of the semiconductor manufacturing apparatuses, pattern dimensions and overlapping accuracy may be deteriorated on the contrary.

BRIEF SUMMARY OF THE INVENTION

A control method for a semiconductor manufacturing apparatus according to an embodiment of the present invention comprises: generating, as log data, a history of operation states of the semiconductor manufacturing apparatus when a wafer is processed by the semiconductor manufacturing apparatus; specifying, based on the log data, processing results in which operation states of the semiconductor manufacturing apparatus are abnormal states out of processing results after the processing of the wafer processed by the semiconductor manufacturing apparatus as abnormal processing results; creating control data for the semiconductor manufacturing apparatus based on the processing results and the abnormal processing results; and controlling the processing by the semiconductor manufacturing apparatus using the control data.

A control system for a semiconductor manufacturing apparatus according to an embodiment of the present invention comprises: a data collecting apparatus that generates, as log data, a history of operation states of the semiconductor manufacturing apparatus when a wafer is processed by the semiconductor manufacturing apparatus; a data analyzing apparatus that specifies, based on the log data, processing results in which operation states of the semiconductor manufacturing apparatus are abnormal states out of processing results after the processing of the wafer processed by the semiconductor manufacturing apparatus as abnormal processing results; a control-data creating apparatus that creates control data for the semiconductor manufacturing apparatus based on the processing results and the abnormal processing results; and a control apparatus that controls the processing by the semiconductor manufacturing apparatus using the control data.

A manufacturing method for a semiconductor device according to an embodiment of the present invention comprises: generating, as log data, a history of operation states of the semiconductor manufacturing apparatus when a wafer is processed by the semiconductor manufacturing apparatus; specifying, based on the log data, processing results in which operation states of the semiconductor manufacturing apparatus are abnormal states out of processing results after the processing of the wafer processed by the semiconductor manufacturing apparatus as abnormal processing results; creating control data for the semiconductor manufacturing apparatus based on the processing results and the abnormal processing results; and controlling the processing by the semiconductor manufacturing apparatus using the control data to thereby manufacture a semiconductor device.

BRIEF DESCRIPTION OF THE DRAWINGS

FIG. 7 is a table of a relation between reticle orthogonality and a weighting coefficient of an exposure apparatus; and FIG. 8 is a table of a relation between a reticle rotation amount and a weighting coefficient of an exposure apparatus.

DETAILED DESCRIPTION OF THE INVENTION

Exemplary embodiments of the present invention are explained in detail below with reference to the accompanying drawings. The present invention is not limited by the embodiments.

Figure 1:
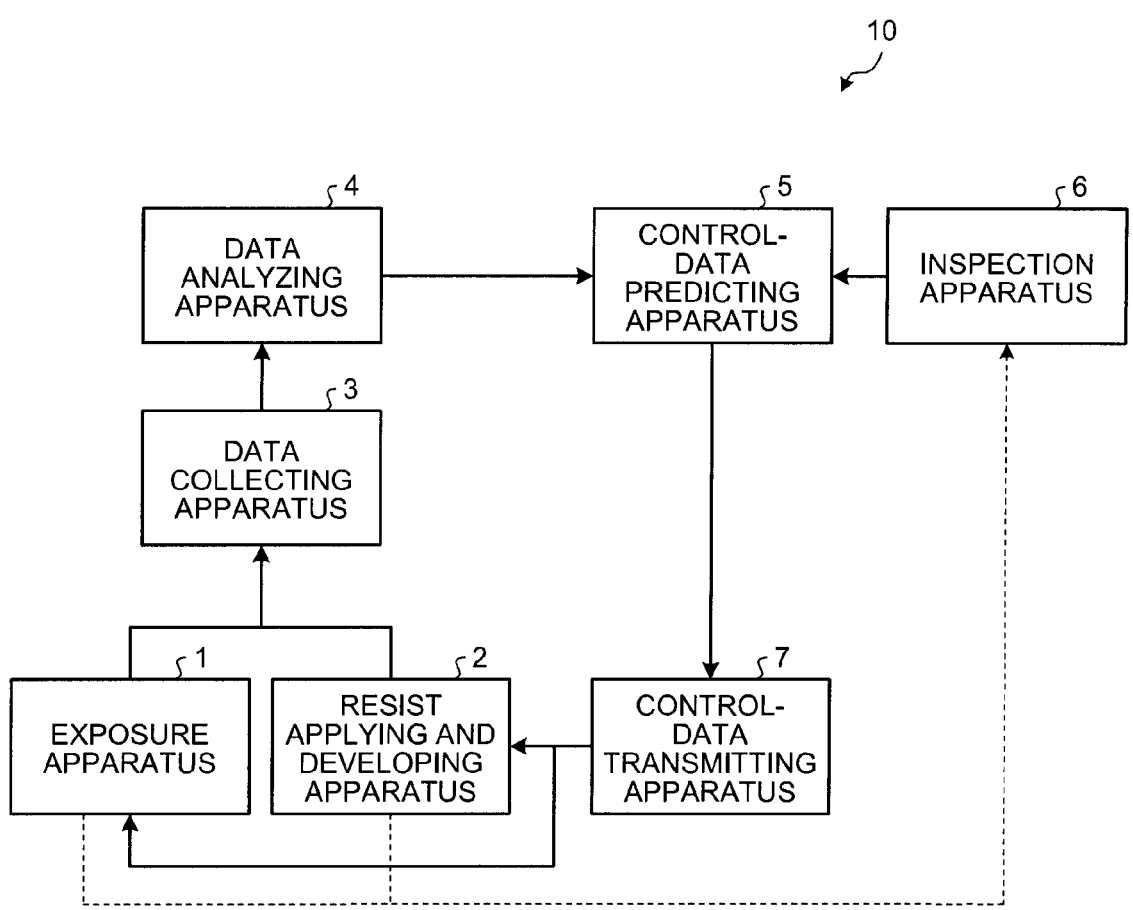
FIG. 1 is a diagram of a configuration of a semiconductor manufacturing system according to an embodiment of the present invention.

FIG. 1 is a diagram of a configuration of a diagram of a configuration of a semiconductor manufacturing system according to an embodiment of the present invention. A semiconductor manufacturing system 10 is a system that manufactures a semiconductor device while controlling a semiconductor manufacturing apparatus with advanced process control (APC). The semiconductor manufacturing system 10 performs quality control (QC) for the semiconductor device using a computer. The semiconductor manufacturing system 10 can be applied to various manufacturing processes (an etching process, a film forming process, etc.). In the following explanation, the semiconductor manufacturing system 10 is applied to a lithography process.

The semiconductor manufacturing system 10 includes an exposure apparatus 1, a resist applying and developing apparatus 2, a data collecting apparatus 3, a data analyzing apparatus 4, a control-data predicting apparatus 5, an inspection apparatus 6, and a control-data transmitting apparatus 7.

The exposure apparatus 1 irradiates exposure light on a wafer (a substrate) applied with a resist to expose the wafer to the exposure light, and transfers a pattern formed on a photomask onto the wafer. The exposure apparatus 1 is, for example, an exposure apparatus of a scan type. The exposure apparatus 1 applies exposure processing to the wafer in lot units while moving the wafer in synchronization with the movement of the photomask (a scanning operation). The exposure apparatus 1 performs the exposure processing while adjusting a dose of the exposure light (an exposure dose) and performs the exposure processing while acquiring log data concerning orthogonality and a rotation amount of the photomask (a reticle), synchronization accuracy of the photomask and the wafer, and the like. The log data generated by the exposure apparatus 1 includes an apparatus state (orthogonality of the photomask, etc.) of the exposure apparatus 1 and an exposure processing history (a lot ID and exposure processing date and time of a lot subjected to the exposure processing). The exposure apparatus 1 transmits the acquired log data to the data collecting apparatus 3.

The resist applying and developing apparatus 2 applies the resist to the wafer and sends the wafer to the exposure apparatus 1. Further, the resist applying and developing apparatus 2 performs development processing for the wafer exposed to the exposure light and having the pattern transferred thereon. The resist applying and developing apparatus 2 performs application processing and development processing in lot units. The resist applying and developing apparatus 2 performs the application processing and the development processing while acquiring log data concerning baking temperature, baking time, and thickness of the resist, thickness of a reflection preventive film, and the like. Log data generated by the resist applying and developing apparatus 2 includes an apparatus state (baking temperature of the resist) of the resist applying and developing apparatus 2 and an application and development processing history (a lot ID and application and development processing date and time of a lot subjected to the application and development processing). The resist applying and developing apparatus 2 transmits the acquired log data to the data collecting apparatus 3. The wafer subjected to the development processing by the resist applying and developing apparatus 2 and having a resist pattern formed thereon is carried to the inspection apparatus 6 lot by lot.

The data collecting apparatus 3 collects the log data by receiving the log data transmitted from the exposure apparatus 1 and the resist applying and developing apparatus 2. The data collecting apparatus 3 accumulates the collected log data.

The data analyzing apparatus 4 accesses the data collecting apparatus 3, analyzes the log data in the data collecting apparatus 3, and detects, as an abnormal lot ID, a lot ID of a wafer processed (exposure processing, application processing, and development processing) while the exposure apparatus 1 and the resist applying and developing apparatus 2 are in an abnormal state. The data analyzing apparatus 4 transmits the detected abnormal lot ID to the control-data predicting apparatus 5.

The inspection apparatus 6 is an apparatus that inspects the wafer having the resist pattern formed thereon carried from the resist applying and developing apparatus 2. The inspection apparatus 6 measures, lot by lot, dimension measurement and overlapping (OL) accuracy of the resist pattern formed on the wafer as a processing result of the processing applied to the wafer. The inspection apparatus 6 transmits a measurement result to the control-data predicting apparatus 5 as inspection data (quality data).

The control-data predicting apparatus 5 specifies, based on the abnormal lot ID, an abnormal value (an abnormal processing result) of the measurement result out of the inspection data and deletes the abnormal value. The control-data predicting apparatus 5 predicts, based on the inspection data from which the abnormal value of the measurement result is deleted, control data (a control factor and a control amount thereof) used for feedback control for the exposure apparatus 1 and the resist applying and developing apparatus 2. The control-data predicting apparatus 5 generates the predicted control data and transmits the control data to the control-data transmitting apparatus 7.

The control-data transmitting apparatus 7 controls the exposure apparatus 1 and the resist applying and developing apparatus 2 using the control data transmitted from the control-data predicting apparatus 5. The apparatuses in the semiconductor manufacturing system 10 are connected to a not-shown host apparatus and operate based on instruction information and the like transmitted from the host apparatus.

Figure 2:
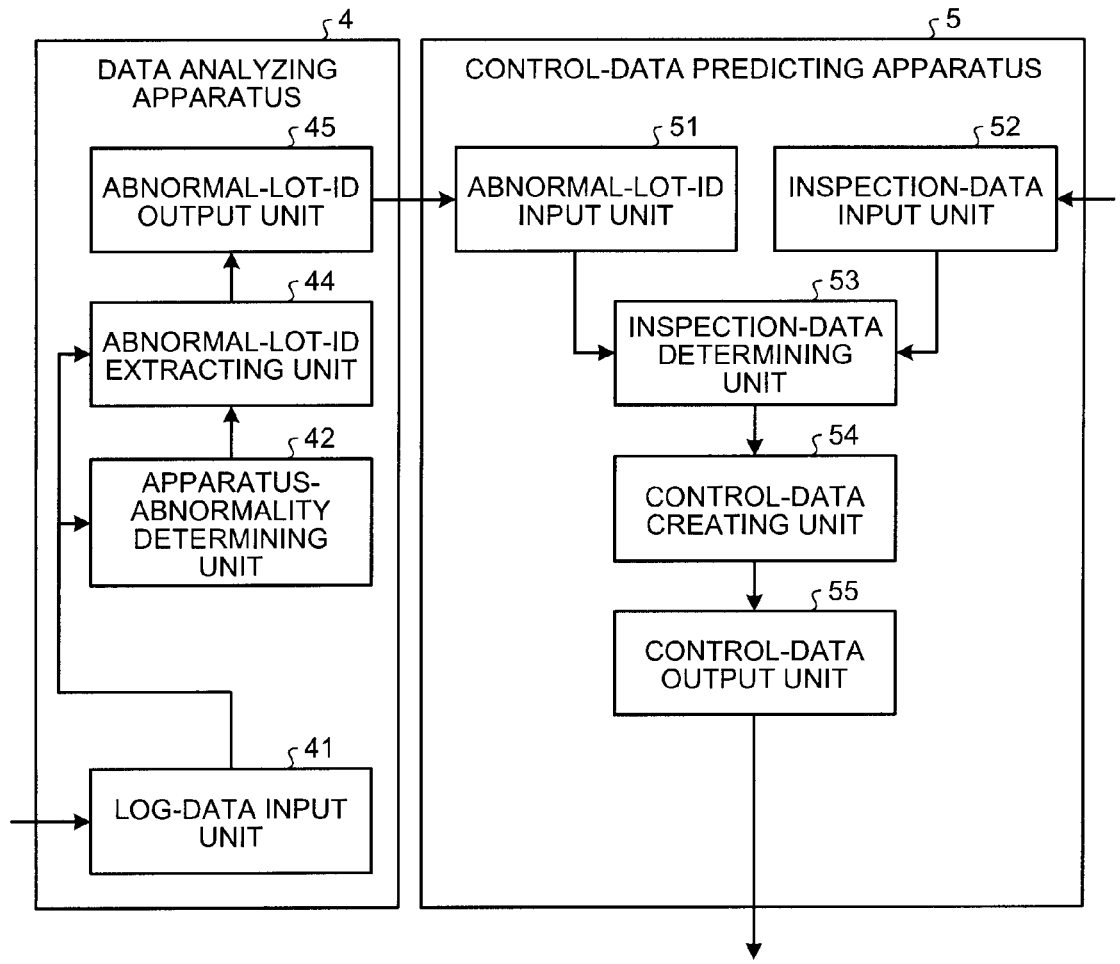
FIG. 2 is a block diagram of a configuration of a data analyzing apparatus and a control-data predicting apparatus according to the embodiment.

FIG. 2 is a block diagram of a configuration of the data analyzing apparatus 4 and the control-data predicting apparatus 5. The data analyzing apparatus 4 includes a log-data input unit 41, an apparatus-abnormality determining unit 42, an abnormal-lot-ID extracting unit 44, and an abnormal-lot-ID output unit 45.

The log-data input unit 41 receives input of the log data accumulated in the data collecting apparatus 3 and sends the log data to the apparatus-abnormality determining unit 42 and the abnormal-lot-ID extracting unit 44. The apparatus-abnormality determining unit 42 determines, based on the log data, whether apparatus abnormality occurs in the exposure apparatus 1 and the resist applying and developing apparatus 2. For example, when the log data is orthogonality of a photomask, the apparatus-abnormality determining unit 42 determines that apparatus abnormality occurs in the exposure apparatus 1 if the orthogonality is larger than a predetermined value (e.g., 0.05 (grad)). When the apparatus-abnormality determining unit 42 determines that the apparatus abnormality occurs, the apparatus-abnormality determining unit 42 specifies, based on the log data, date and time when the apparatus abnormality occurs. The apparatus-abnormality determining unit 42 transmits information (an apparatus ID, etc.) concerning the apparatus in which it is determined that the apparatus abnormality occurs and the date and time when the apparatus abnormality occurs to the abnormal-lot-ID extracting unit 44.

The abnormal-lot-ID extracting unit 44 extracts an abnormal lot ID from the log data based on the apparatus ID of the apparatus in which the apparatus abnormality occurs and the date and time when the apparatus abnormality occurs. The abnormal-lot-ID extracting unit 44 sends the extracted abnormal lot ID to the abnormal-lot-ID output unit 45. The abnormal-lot-ID output unit 45 outputs the abnormal lot ID to the control-data predicting apparatus 5.

The control-data predicting apparatus 5 includes an abnormal-lot-ID input unit 51, an inspection-data input unit 52, an inspection-data determining unit 53, a control-data creating unit 54, and a control-data output unit 55. The abnormal-lot-ID input unit 51 is connected to the abnormal-lot-ID output unit 45 of the data analyzing unit 4. The abnormal-lot-ID input unit 51 receives input of the abnormal lot ID sent from the abnormal-lot-ID output unit 45 and sends the abnormal lot ID to the inspection-data determining unit 53. The inspection-data input unit 52 receives input of the measurement result (inspection data) of the resist pattern transmitted from the inspection apparatus 6 and sends the measurement result to the inspection-data determining unit 53.

The inspection-data determining unit 53 determines, based on the abnormal lot ID, whether measurement values in the inspection data are abnormal values and extracts abnormal values of the measurement result out of the inspection data. The inspection-data determining unit 53 excludes the abnormal values from the inspection data and sends the inspection data to the control-data creating unit 54.

The control-data creating unit 54 creates, based on the inspection data sent from the inspection-data determining unit 53, control data used for the feedback control for the exposure apparatus 1 and the resist applying and developing apparatus 2. The control-data creating unit 54 sends the created control data to the control-data output unit 55. The control-data output unit 55 transmits the control data to the control-data transmitting apparatus 7.

Figure 3:
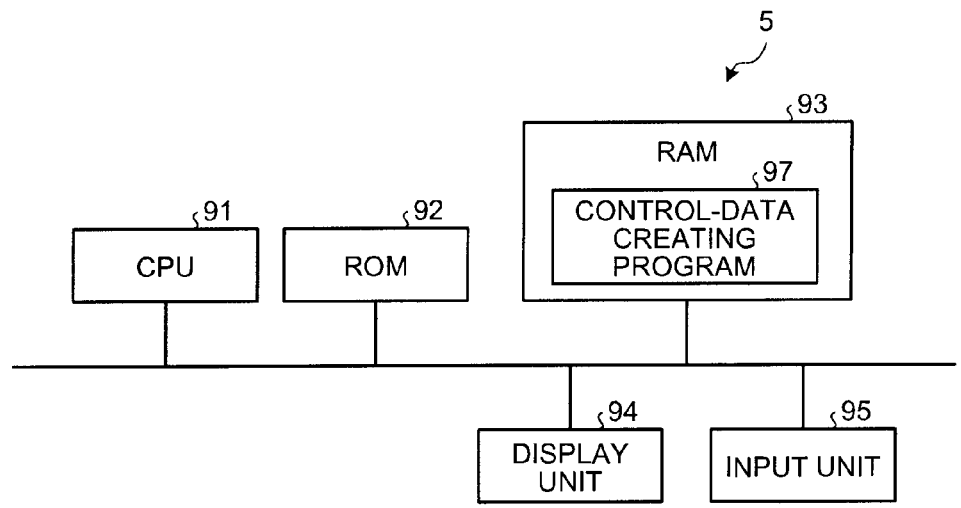
FIG. 3 is a diagram of a hardware configuration of the control-data predicting apparatus according to the embodiment.

FIG. 3 is a diagram of a hardware configuration of the control-data predicting apparatus 5 according to this embodiment. The control-data predicting apparatus 5 includes a central processing unit (CPU) 91, a read only memory (ROM) 92, a random access memory (RAM) 93, a display unit 94, and an input unit 95. In the control-data predicting apparatus 5, the CPU 91, the ROM 92, the RAM 93, the display unit 94, and the input unit 95 are connected via a bus line.

The CPU 91 creates control data using a control-data creating program 97, which is a computer program for creating control data. The display unit 94 is a display device such as a liquid crystal monitor and displays, based on an instruction from the CPU 91, various kinds of information (inspection data, an abnormal lot ID, etc.) used in creating control data. The input unit 95 includes a mouse and a keyboard and receives input of instruction information (parameters necessary for creation of control data, etc.) input from the outside by a user. The instruction information input to the input unit 95 is sent to the CPU 91.

The control-data creating program 97 is stored in the ROM 92 and loaded to the RAM 93 via the bus line. The CPU 91 executes the control-data creating program 97 loaded to the RAM 93. Specifically, in the control-data predicting apparatus 5, the CPU 91 reads out the control-data creating program 97 from the ROM 92, expands the control-data creating program 97 in a program storage area in the RAM 93, and executes various kinds of processing according to an instruction input from the input unit 95 by the user. The CPU 91 temporarily stores various data generated in the various kinds of processing in a data storage area formed in the RAM 93.

The control-data creating program 97 executed in the control-data predicting apparatus 5 according to this embodiment forms a module including the units explained above (the abnormal-lot-ID input unit 51, the inspection-data input unit 52, the inspection-data determining unit 53, the control-data creating unit 54, and the control-data output unit 55). When the units are loaded onto a main storage device, the abnormal-lot-ID input unit 51, the inspection-data input unit 52, the inspection-data determining unit 53, the control-data creating unit 54, and the control-data output unit 55 are generated on the main storage device.

The control-data creating program 97 executed in the control-data predicting apparatus 5 according to this embodiment can be stored on a computer, which is connected to a network such as the Internet, and provided by download through the network. The control-data creating program 97 executed in the control-data predicting apparatus 5 according to this embodiment can be provided or distributed through the network such as the Internet. The control-data creating program 97 according to this embodiment can be incorporated in a ROM or the like in advance and provided to the control-data predicting apparatus 5.

Figure 4:
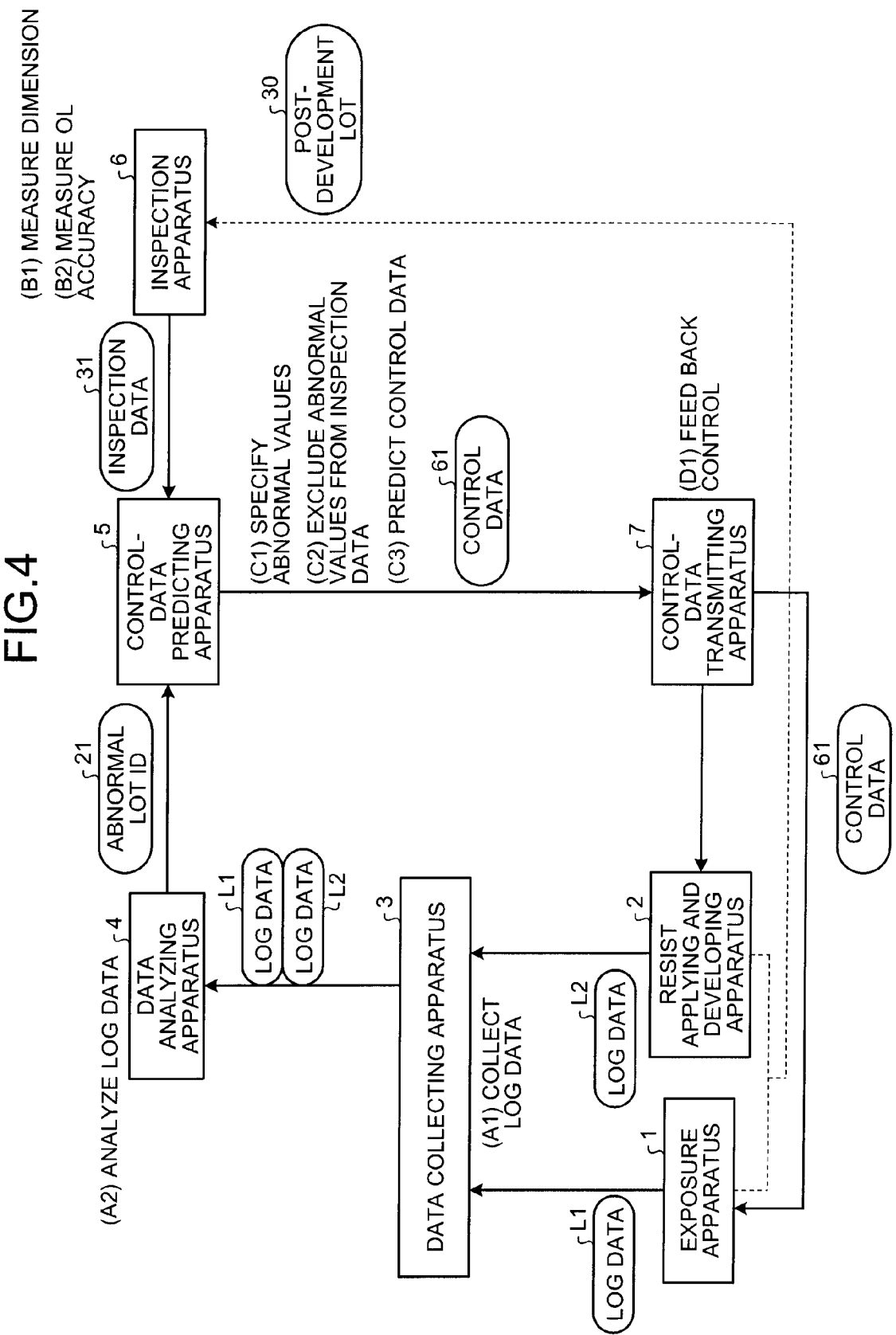
FIG. 4 is a diagram for explaining an operation procedure of the semiconductor manufacturing system.
Figure 5:
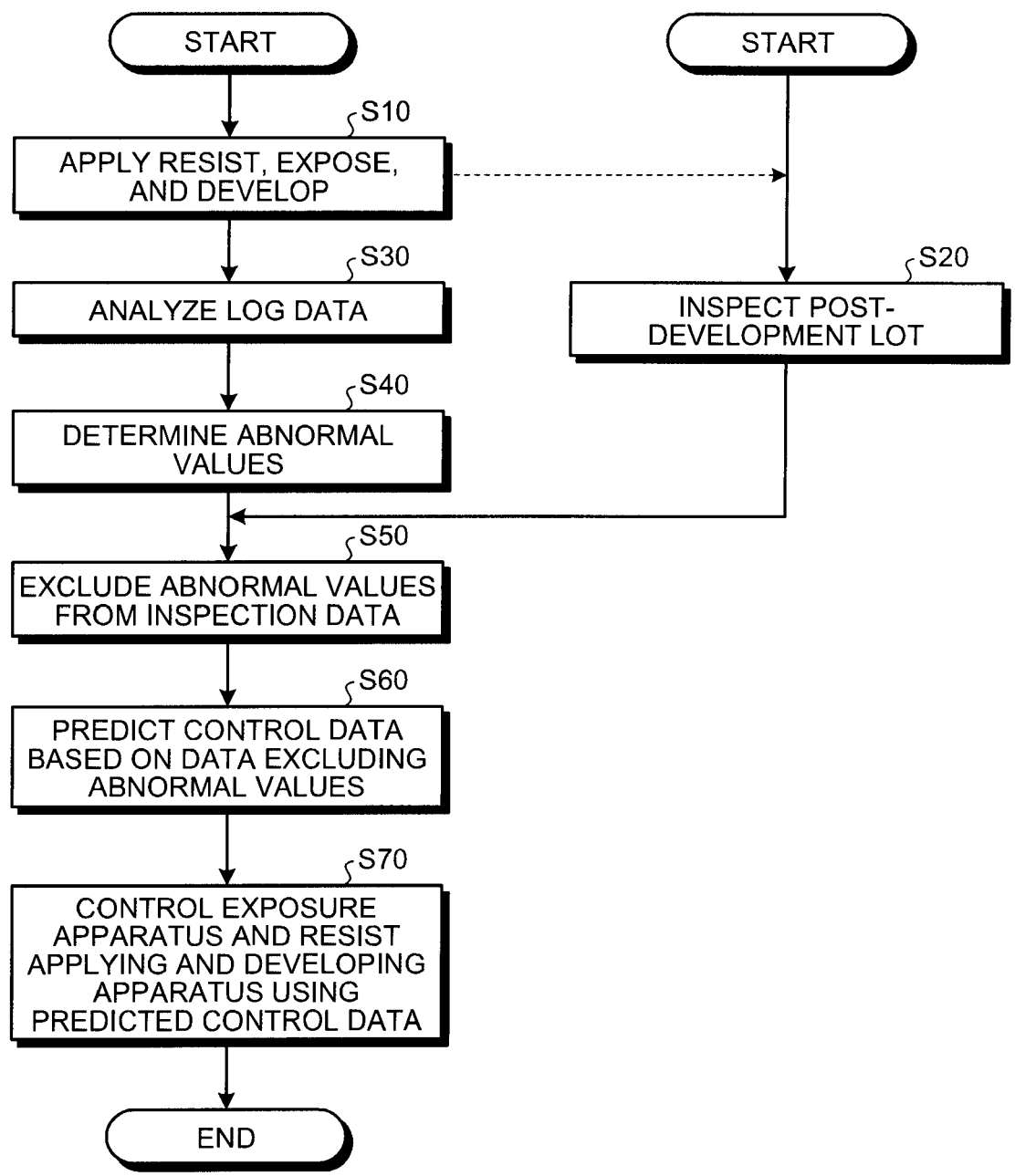
FIG. 5 is a flowchart of the operation procedure of the semiconductor manufacturing system.

FIG. 4 is a diagram for explaining an operation procedure of the semiconductor manufacturing system 10. FIG. 5 is a flowchart of the operation procedure of the semiconductor manufacturing system 10.

The resist applying and developing apparatus 2 applies resist to a wafer and sends the wafer applied with the resist to the exposure apparatus 1. The exposure apparatus 1 applies exposure processing to the wafer and sends the wafer after exposure to the resist applying and developing apparatus 2. The resist applying and developing apparatus 2 applies development processing to the wafer (step S10). The wafer subjected to the development processing is sent to the inspection apparatus 6 as a post-development lot 30 lot by lot.

To inspects the post-development lot 30, the inspection apparatus 6 measures dimensions and OL accuracy of a resist pattern formed on the wafer lot by lot (B1 and B2) (step S20). The inspection apparatus 6 transmits a measurement result to the control-data predicting apparatus 5 as inspection data 31 (QC data).

The exposure apparatus 1 generates history information (log data L1) concerning a state of the apparatus at predetermined timing and transmits the log data L1 to the data collecting apparatus 3. The log data L1 includes data obtained when the wafer in the post-development lot 30 sent to the inspection apparatus 6 is exposed.

The resist applying and developing apparatus 2 generates history information (log data L2) concerning a state of the apparatus at predetermined timing and transmits the log data L2 to the data collecting apparatus 3. The log data L2 includes data obtained when the wafer in the post-development lot 30 sent to the inspection apparatus 6 is applied with a resist and developed.

The data collecting apparatus 3 collects the log data L1 transmitted from the exposure apparatus 1 and the log data L2 transmitted from the resist applying and developing apparatus 2 and stores the log data L1 and L2 in a storing unit such as a memory (A1).

The data analyzing apparatus 4 accesses the data collecting apparatus 3 and receives the log data L1 and L2 from the data collecting apparatus 3. The data analyzing apparatus 4 analyzes the log data L1 and L2 to thereby detect an ID (a lot ID) of a lot processed when apparatus abnormality occurs (A2) (step S30).

Specifically, the log-data input unit 41 of the data analyzing apparatus 4 receives input of the log data L1 and L2 accumulated in the data collecting apparatus 3 and sends the log data L1 and L2 to the apparatus-abnormality determining unit 42 and the abnormal-lot-ID extracting unit 44. The apparatus-abnormality determining unit 42 determines, based on the log data L1 and L2, whether apparatus abnormality occurs in the exposure apparatus 1 and the resist applying and developing apparatus 2. When the apparatus-abnormality determining unit 42 determines that apparatus abnormality occurs, the apparatus-abnormality determining unit 42 specifies, based on the log data L1 and L2, date and time when the apparatus abnormality occurs. The apparatus-abnormality determining unit 42 transmits an apparatus ID of the apparatus in which it is determined that the apparatus abnormality occurs and the date and time when the apparatus abnormality occurs to the abnormal-lot-ID extracting unit 44.

The abnormal-lot-ID extracting unit 44 extracts, based on the apparatus ID of the apparatus in which the apparatus abnormality occurs and the date and time when the apparatus abnormality occurs, an abnormal lot ID 21 from the log data L1 and L2. The abnormal-lot-ID extracting unit 44 outputs the extracted abnormal lot ID 21 to the control-data predicting apparatus 5 from the abnormal-lot-ID output unit 45.

The control-data predicting apparatus 5 matches the abnormal lot ID 21 and the inspection data 31 and determines whether measurement values should be deleted. Specifically, the control-data predicting apparatus 5 determines, based on the abnormal lot ID 21, whether the measurement values in the inspection data 31 are abnormal (step S40) and deletes abnormal values of the measurement values from the inspection data 31 (step S50). The control-data predicting apparatus 5 predicts, based on the inspection data 31 obtained by excluding the abnormal values of the measurement values from the inspection data 31, control data used for the feedback control for the exposure apparatus 1 and the resist applying and developing apparatus 2 (step S60).

Specifically, the abnormal-lot-ID input unit 51 of the control-data predicting apparatus 5 receives input of the abnormal lot ID 21 sent from the data analyzing apparatus 4 and sends the abnormal lot ID 21 to the inspection-data determining unit 53. The inspection-data input unit 52 receives input of the inspection data 31 sent from the inspection apparatus 6 and sends the inspection data 31 to the inspection-data determining unit 53.

The inspection-data determining unit 53 determines, based on the abnormal lot ID 21, whether the measurement values in the inspection data 31 are abnormal values and specifies and extracts abnormal values of the measurement values out of the inspection data 31 (C1). The inspection-data determining unit 53 excludes the abnormal values from the inspection data 31 and sends the inspection data 31 to the control-data creating unit 54 (C2).

Figure 6:
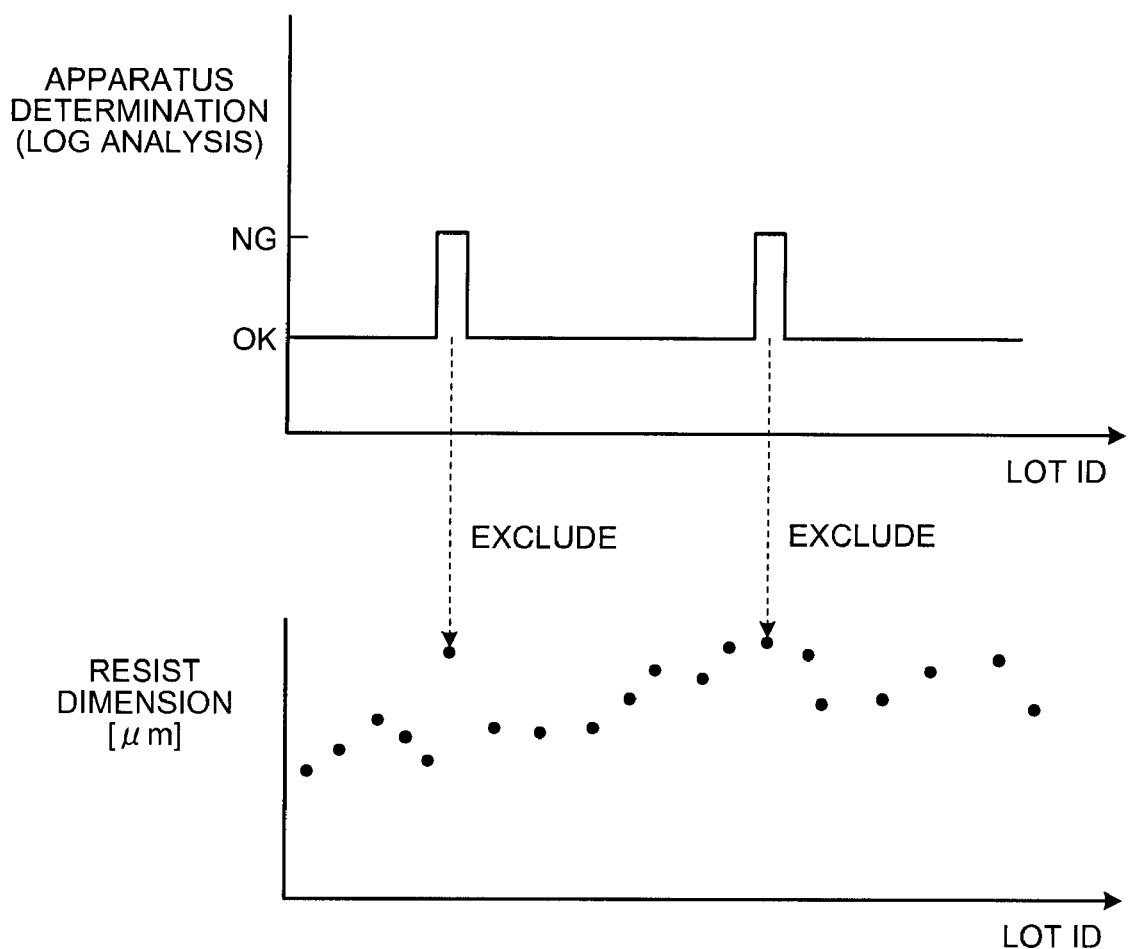
FIG. 6 is a diagram for explaining processing for excluding abnormal values.

FIG. 6 is a diagram for explaining processing for excluding abnormal values. In the following explanation, a measurement result in the inspection data 31 is a resist dimension.

The data analyzing apparatus 4 analyzes the log data L1 and L2 to thereby detect a lot ID of a lot in which it is determined that an apparatus state is abnormal. Therefore, the data analyzing apparatus 4 determines whether an apparatus state is abnormal lot by lot. The data analyzing apparatus 4 sends an ID of a lot in which the apparatus state is abnormal (NG) to the control-data predicting apparatus 5 as an abnormal lot ID.

The control-data predicting apparatus 5 determines that a resist dimension of the lot corresponding to the abnormal lot ID is an abnormal value and excludes the resist dimension from the measurement result. Consequently, the control-data predicting apparatus 5 can generate a measurement result not including the abnormal value.

The control-data creating unit 54 predicts and creates, based on the inspection data 31 sent from the inspection-data determining unit 53, control data 61 used for the feedback control for the exposure apparatus 1 and the resist applying and developing apparatus 2 (C3). The control-data creating unit 54 creates the control data 61 based on, for example, the inspection data 31 for five lots inspected most recently. For example, when a control object is a resist dimension, the control-data creating unit 54 calculates an average of measurement results from measurement results (resist dimensions) for five lots inspected most recently. The control-data creating unit 54 calculates, based on a desired resist dimension and the calculated average of the resist dimensions, conditions (an expose dose, baking temperature, etc.) for controlling the resist dimension. In the following explanation, a set condition for controlling the resist dimension is the exposure dose. For example, when the desired resist dimension is 50 nanometers and the calculated average of the resist dimensions is 45 nanometers, the control-data creating unit 54 calculates an exposure dose that increases the resist dimension by 5 nanometers and sets the calculated exposure dose in the control data 61.

The control-data creating unit 54 can calculate an exposure dose for controlling the resist dimension for each measurement result. In this case, the control-data creating unit 54 averages calculated exposure doses for five lots to calculate an exposure dose. The control-data creating unit 54 sets the calculated exposure dose in the control data 61.

The control-data creating unit 54 transmits the created control data 61 from the control-data output unit 55 to the control-data transmitting apparatus 7. The control-data transmitting apparatus 7 controls the exposure apparatus 1 and the resist applying and developing apparatus 2 using the control data 61 transmitted from the control-data predicting apparatus 5 (D1) (step S70). Consequently, the semiconductor manufacturing system 10 performs processing of the wafer reflecting the processing result measured by the inspection apparatus 6 on the control of the exposure apparatus 1 and the resist applying and developing apparatus 2.

In the semiconductor manufacturing system 10, semiconductor manufacturing processes such as an exposure process, an etching process, and a film forming process are performed according to such feedback control and a semiconductor device is manufactured by the semiconductor manufacturing apparatus.

Whichever of the analysis processing for the log data L1 and L2 by the data analyzing apparatus 4 and the dimension measurement and the OL accuracy measurement for the resist pattern by the inspection apparatus 6 can be performed earlier or both the analysis processing and the dimension measurement and the OL accuracy measurement can be simultaneously performed.

In this embodiment, the measurement result of the lot, the abnormal lot ID 21 of which is sent, is determined as the abnormal value and excluded from the measurement results. However, the abnormal value can be included in the measurement results at a ratio corresponding to apparatus states of the exposure apparatus 1 and the resist applying and developing apparatus 2. In this case, the data analyzing apparatus 4 sets, based on the log data L1 and L2, a weighting coefficient corresponding to the apparatus states of the exposure apparatus 1 and the resist applying and developing apparatus 2 for each abnormal lot ID. The weighting coefficient is weighting on a measurement result used when the control-data predicting apparatus 5 creates the control data 61. A measurement result with weighting "0" is excluded from the measurement results. On the other hand, a measurement result with weighting "1" is directly adopted as a measurement result. The control-data predicting apparatus 5 performs weighting on the measurement results according to the weighting coefficient to create the control data 61.

A relation between apparatus states of the exposure apparatus 1 and the resist applying and developing apparatus 2 and a weighting coefficient is explained. The data analyzing apparatus 4 determines, based on the log data L1 and L2, apparatus states of the exposure apparatus 1 and the resist applying and developing apparatus 2. An apparatus state of the exposure apparatus 1 is explained below.

FIG. 7 is an information table of a relation between reticle orthogonality and a weighting coefficient of the exposure apparatus 1. FIG. 8 is an information table of a relation between a reticle rotation amount and the weighting coefficient of the exposure apparatus 1. An information table 101 concerning reticle orthogonality shown in FIG. 7 indicates a correspondence relation between reticle orthogonality and a weighting coefficient of the log data L1 (detailed exposure data). An information table 102 concerning a reticle rotation amount shown in FIG. 8 indicates a correspondence relation between a reticle rotation amount and a weighting coefficient of the log data L1 (detailed exposure data).

The data analyzing apparatus 4 sets, based on the information table 101 concerning the reticle orthogonality and the information table 102 concerning the reticle rotation amount, a weighting coefficient in the abnormal lot ID 21. For example, when the reticle orthogonality is equal to or larger than 0.05, the apparatus-abnormality determining unit 42 of the data analyzing apparatus 4 sets the weighting coefficient to "0". When the reticle orthogonality is equal to or larger than 0.04 and smaller than 0.05, the apparatus-abnormality determining unit 42 sets the weighting coefficient to "0.5". When the reticle orthogonality is smaller than 0.04, the apparatus-abnormality determining unit 42 sets the weighting coefficient to "1".

When the reticle rotation amount is equal to or larger than 0.05, the apparatus-abnormality determining unit 42 sets the weighting coefficient to "0". When the reticle rotation amount is equal to or larger than 0.04 and smaller than 0.05, the apparatus-abnormality determining unit 42 sets the weighting coefficient to "0.5". When the reticle rotation amount is smaller than 0.04, the apparatus-abnormality determining unit 42 sets the weighting coefficient to "1".

The abnormal-lot-ID extracting unit 44 of the data analyzing apparatus 4 associates the weighting coefficient set by the apparatus-abnormality determining unit 42 and the abnormal lot ID 21. Information in which the weighting coefficient and the abnormal lot ID 21 are associated is transmitted to the control-data predicting apparatus 5.

When a measurement result (an abnormal value) of the lot corresponding to the abnormal lot ID 21 is extracted, the inspection-data determining unit 53 of the control-data predicting apparatus 5 deletes a measurement result with a weighting coefficient "0" from the inspection data 31 determining that the measurement result is an abnormal value. Further, the inspection-data determining unit 53 puts undeleted other abnormal values in the inspection data 31 in association with weighting coefficients and sends the abnormal values to the control-data creating unit 54.

The control-data creating unit 54 creates the control data 61 using measurement results not determined as abnormal values and measurement results that are abnormal values but not deleted (measurement results associated with weighting coefficients).

For example, when a measurement result with a weighting coefficient "0.5" is included in measurement results for five lots inspected most recently, the control-data creating unit 54 reflects the measurement result on the feedback control by 50%. Specifically, when a desired resist dimension is 50 nanometers and a calculated average of resist dimensions is 45 nanometers, the control-data creating unit 54 calculates an exposure dose to increase a resist dimension by 2.5 nanometers. The control-data creating unit 54 calculates, using an exposure dose calculated based on measurement results determined as normal values and an exposure dose calculated by using a weighting coefficient, an exposure dose of a lot to be processed next.

When measurement results for five lots sent from the inspection-data determining unit 53 are one-hundred data (resist dimension measurement values in one-hundred places) and there is only one measurement result for which the weighting coefficient "0.5" is set, the measurement result for which the weighting coefficient "0.5" is set is reflected on the feedback control by 50% of $1/100$ (0.5%) as a measurement result.

In the explanation of this embodiment, the feedback control is performed in lot units. However, the feedback control can be performed in wafer units. In this embodiment, the resist applying and developing apparatus 2 performs the resist application processing and the development processing. However, an apparatus that performs the resist application processing and an apparatus that performs the development processing can be separate apparatuses.

As explained above, according to the embodiment, because abnormal values are excluded from the inspection data 31 based on the log data L1 and L2, it is possible to create accurate control data corresponding to states of semiconductor manufacturing apparatuses such as the exposure apparatus 1 and the resist applying and developing apparatus 2. Therefore, it is possible to perform accurate processing control corresponding to the states of the semiconductor manufacturing apparatuses. Consequently, because a semiconductor device can be manufactured with accurate control data, it is possible to improve product yield. Further, because weighting coefficients corresponding to the states of the semiconductor manufacturing apparatuses are set for the measurement values of the inspection data 31 to create control data, it is possible to create more accurate control data corresponding to the states of the semiconductor manufacturing apparatuses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control method for a semiconductor manufacturing apparatus, comprising:
   generating, as log data, a history of operation states of the semiconductor manufacturing apparatus when a wafer is processed by the semiconductor manufacturing apparatus;
   identifying, based on the log data, abnormal processing results within processing results produced by the semiconductor manufacturing apparatus in processing the wafer, the abnormal processing results comprising results of processing of the wafer when the semiconductor manufacturing apparatus is in abnormal operation states;

setting, for the processing results, weighting corresponding to degrees of abnormality of the abnormal processing results;

creating control data for the semiconductor manufacturing apparatus using the processing results, the abnormal processing results, and the weighting; and controlling the processing by the semiconductor manufacturing apparatus using the control data.

2. The control method for a semiconductor manufacturing apparatus according to claim 1, further comprising, in creating the control data, excluding processing results corresponding to the abnormal processing results from the processing results and creating the control data using the remaining processing results not excluded.

3. The control method for a semiconductor manufacturing apparatus according to claim 1, wherein
the weighting is weighting coefficients for the processing results, and
the control method further includes excluding the abnormal processing results having a weighting coefficient of "0" from the processing results and creating the control data using the remaining processing results not excluded and the abnormal processing results with weighting coefficients other than 0.

4. The control method for a semiconductor manufacturing apparatus according to claim 1, wherein the log data includes information concerning a history of apparatus states of the semiconductor manufacturing apparatus.

5. The control method for a semiconductor manufacturing apparatus according to claim 1, wherein the log data includes information concerning a history of processing by the semiconductor manufacturing apparatus.

6. The control method for a semiconductor manufacturing apparatus according to claim 1, wherein the processing results are measurement results measured for each piece of the wafer or for each group of a plurality of the wafers, which is a predetermined processing unit.

7. The control method for a semiconductor manufacturing apparatus according to claim 1, wherein the control data is created based on a predetermined number of the processing results and the abnormal processing results measured most recently among the processing results and the abnormal processing results.

8. The control method for a semiconductor manufacturing apparatus according to claim 1, wherein
the processing is processing concerning a lithography process, and
the control data is an instruction for controlling a resist dimension.

9. A control system for a semiconductor manufacturing apparatus, comprising:
a data collecting apparatus that generates, as log data, a history of operation states of the semiconductor manufacturing apparatus when a wafer is processed by the semiconductor manufacturing apparatus;
a data analyzing apparatus that:
identifies, based on the log data, abnormal processing results within produced by the semiconductor manufacturing apparatus in processing the wafer, the abnormal processing results comprising results of processing of the wafer when the semiconductor manufacturing apparatus is in abnormal operation states; and sets, for the processing results, weighting corresponding to degrees of abnormality of the abnormal processing results;

a control-data creating apparatus that creates control data for the semiconductor manufacturing apparatus using the processing results, the abnormal processing results, and the weighting; and a control apparatus that controls the processing by the semiconductor manufacturing apparatus using the control data.

10. The control system for a semiconductor manufacturing apparatus according to claim 9, wherein the control-data creating apparatus excludes processing results corresponding to the abnormal processing results from the processing results and creates the control data using the remaining processing results not excluded.

11. The control system for a semiconductor manufacturing apparatus according to claim 10, wherein
the data analyzing apparatus sets weighting coefficients for the processing results as the weighting, and
the control-data creating apparatus excludes the abnormal processing results having a weighting coefficient of "0" from the processing results and creates the control data using the remaining processing results not excluded and the abnormal processing results with weighting coefficients other than 0.

12. The control system for a semiconductor manufacturing apparatus according to claim 9, wherein the data collecting apparatus generates the log data including information concerning a history of apparatus states of the semiconductor manufacturing apparatus.

13. The control system for a semiconductor manufacturing apparatus according to claim 9, wherein the data collecting apparatus generates the log data including information concerning a history of processing by the semiconductor manufacturing apparatus.

14. The control system for a semiconductor manufacturing apparatus according to claim 9, wherein the processing results are measurement results measured for each piece of the wafer or for each group of a plurality of the wafers, which is a predetermined processing unit.

15. The control system for a semiconductor manufacturing apparatus according to claim 9, wherein the control data is created based on a predetermined number of the processing results and the abnormal processing results measured most recently among the processing results and the abnormal processing results.

16. The control system for a semiconductor manufacturing apparatus according to claim 9, wherein
the processing is processing concerning a lithography process, and
the control-data creating apparatus creates an instruction for controlling a resist dimension as the control data.

17. A manufacturing method for a semiconductor device, comprising:
generating, as log data, a history of operation states of the semiconductor manufacturing apparatus when a wafer is processed by a semiconductor manufacturing apparatus;
identifying, based on the log data, abnormal processing results within processing results produced by the semiconductor manufacturing apparatus in processing the wafer, the abnormal processing results comprising results of processing of the wafer when the semiconductor manufacturing apparatus is in abnormal operation states;

setting, for the processing results, weighting corresponding to degrees of abnormality of the abnormal processing results;

creating control data for the semiconductor manufacturing apparatus using the processing results, the abnormal processing results, and the weighting; and controlling the processing by the semiconductor manufacturing apparatus using the control data to thereby manufacture a semiconductor device.

* * * * *